United States Patent [19]

Fujimura et al.

[11] Patent Number: 5,909,588
[45] Date of Patent: Jun. 1, 1999

[54] PROCESSOR ARCHITECTURE WITH DIVISIONAL SIGNAL IN INSTRUCTION DECODE FOR PARALLEL STORING OF VARIABLE BIT-WIDTH RESULTS IN SEPARATE MEMORY LOCATIONS

[75] Inventors: Hiroki Fujimura; Hiroyuki Takai; Toshiyuki Yaguchi, all of Kanagawa-ken; Seiji Koino, Tokyo; Mikio Takasugi, Kanagawa-ken; Atsushi Kunimatsu, Tokyo, all of Japan

[73] Assignee: Kabushiki Kaisha Toshiba, Kawasaki, Japan

[21] Appl. No.: 08/671,619

[22] Filed: Jun. 28, 1996

[30] Foreign Application Priority Data

Jun. 29, 1995 [JP] Japan ................................. 7-163676

[51] Int. Cl.[6] ......................... G06F 12/04; G06F 9/345
[52] U.S. Cl. ................... 395/800.23; 395/380; 395/386; 711/209; 711/214
[58] Field of Search ................................. 711/214, 209; 395/380, 800.23, 386

[56] References Cited

U.S. PATENT DOCUMENTS

| | | | |
|---|---|---|---|
| 4,020,470 | 4/1977 | Drimak et al. | 711/202 |
| 4,538,223 | 8/1985 | Vahlstrom et al. | 711/214 |
| 5,155,820 | 10/1992 | Gibson | 395/386 |
| 5,606,520 | 2/1997 | Gove et al. | 711/217 |
| 5,636,351 | 6/1997 | Lee | 395/380 |
| 5,666,510 | 9/1997 | Mitsuishi et al. | 711/220 |
| 5,680,598 | 10/1997 | Farrell et al. | 395/568 |
| 5,717,946 | 2/1998 | Satou et al. | 395/800.23 |

OTHER PUBLICATIONS

Lee, Ruby B. "Precision Architecture." IEEE Computer, vol. 22, No. 1, Jan. 1989, pp. 78–89.

*Primary Examiner*—Daniel H. Pan
*Assistant Examiner*—Jeffrey Allen Rossi
*Attorney, Agent, or Firm*—Foley & Lardner

[57] ABSTRACT

An instruction code is received by an instruction input section 103 and then decoded by the instruction decode section 105 to generate an operand and control signals. The instruction division control section 109 generates a division control signal based on the control signals and an operand selection section 107 generates an operand having a desired bit width by using the operand from the instruction decode section 105 based on the division control signal. An arithmetic section 111 divides the operand into a desired bit width parts based on the division control signal and performs arithmetic operation. A memory access control section 115 receives calculated address and transfers this calculated address and the division control signal to a memory. The memory access control section 115 receives data from the memory and transfers the data into the arithmetic result store section 113.

16 Claims, 13 Drawing Sheets

FIG.5

PROGRAM

| CLOCK<br>INSTRUCTION | 1 | 2 | 3 | 4 | 5 | 6 | 7 | 8 | 9 |
|---|---|---|---|---|---|---|---|---|---|
| MLD | IF | ID | (EX) | MA | WB | | | | |
| MLD | | IF | ID | EX | MA | WB | | | |
| MAC1 | | | IF | ID | EX | MA | WB | | |
| MAC2 | | | | IF | ID | EX | MA | WB | |
| MAC2 | | | | | IF | ID | EX | MA | (WB) |

FIG.14
PRIOR ART

| CLOCK INSTRUCTION | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| LD | IF | ID | (EX) | MA | WB | | | | | | | | | |
| LD | | IF | ID | EX | MA | WB | | | | | | | | |
| LD | | | IF | ID | EX | MA | WB | | | | | | | |
| LD | | | | IF | ID | EX | MA | WB | | | | | | |
| LD | | | | | IF | ID | EX | MA | WB | | | | | |
| LD | | | | | | IF | ID | EX | MA | WB | | | | |
| MAC | | | | | | | IF | ID | EX | MA | WB | | | |
| MAC | | | | | | | | IF | ID | EX | MA | WB | | |
| MAC | | | | | | | | | IF | ID | EX | MA | WB | |
| STACC | | | | | | | | | | IF | ID | EX | MA | (WB) |

PROCESSOR ARCHITECTURE WITH DIVISIONAL SIGNAL IN INSTRUCTION DECODE FOR PARALLEL STORING OF VARIABLE BIT-WIDTH RESULTS IN SEPARATE MEMORY LOCATIONS

BACKGROUND OF THE INVENTION

1. Field of the Invention

The present invention relates to an information processing device, and more particularly, it relates to an information processing device which is capable of executing read/write operations of a plurality of data items (or load/store operations for a plurality of operands) simultaneously.

2. Description of the Prior Art

Traditionally, in conventional data processing devices, it is well known that there are pipelined data processing devices in which an instruction fetch step and an instruction execution step are divided into a plurality of pipelined stages and these stages are pre-controlled in execution in order to decrease an instruction execution time period.

FIG. 11 is a block diagram showing a configuration of a conventional information processing device 1100 using this pipelined method. In the same diagram, the information processing device 1100 comprises an instruction register (IR) 3, a decoder (DEC) 5 for receiving data in the IR 3 and for generating various types of control signals, a sign extension section (EXT) 7 for an extension of the sign of a displacement data item in the data stored in the IR 3, a general purpose register (GR) 9, a selector (SEL) 11 for selecting one of a data item stored in the GR 9 and an output data item in the EXT 7 based on the control signal transferred from the DEC 5, an arithmetic logic unit (ALU) 15, a memory address register (MAR) 23 for latching an address data item generated by the ALU 15, a memory data register for latching a data item which is read out from a memory (not shown), an address bus (ABSU) 29 through which an address calculated and generated by the ALU 15 is transferred to the memory (not shown), and an data bus (DBUS) 31 through which required data stored in the memory is received from the memory (not shown).

The control signals generated by the DEC 5 are transferred to the GR 9 as a control signal GRC, the SEL 11 as a control signal SELC, and the ALU 15 as a control signal ALUC (each control line through which each control signal is transferred is designated by one line in FIG. 11 for brevity.).

Next, an operand load operation of the conventional information processing device 1100 having the configuration shown in FIG. 11 will be explained. The operand load operation is divided into a plurality of pipelined stages. We will explain each pipelined stage for the operand load operation.

First, in an IF (instruction fetch) stage, an instruction on an instruction bus is fetched by the IR 3. In the following ID (instruction decode) stage, the instruction in the IR 3 is decoded, and then the various control signals, a control signal GRC for the GR 9, a control signal SELC for the SEL 11, a control signal ALUC for the ALU 15, and the like used for an address calculation are generated and transferred. In addition, the data stored in the GR9 is transferred to the ALU 15. The ALU 15 receives two data items transferred from the GR 9 and the EXT 7. The data from the EXT 7 is selected by the control signal SELC transferred from the DEC 5.

Next, in the EX (execution) stage, the ALU 15 receives both the outputs from the GR9 and the EXT 7 and then performs an address calculation based on the control signal ALUC and generates (or calculates) an memory address. After the completion of this pipelined stage, the MAR 23 latches an memory address transferred from the ALU 15. In a following memory access (MA) stage, the memory address is sent to the bus ABUS 29 in order to perform a memory access operation.

Because a data item which has been read from the memory is on the bus DBUS 31, the data item is latched by the MDR 27. In a final WB (write back) stage, the data item from the MDR 27 is transferred to the GR9.

As described above in detail, in the conventional information processing device 1100 having the configuration shown in FIG. 11, because only one read/write operation for one data item per one cycle is carried out, it must be required to perform a plurality of operation times of the above read-out/write-in operations for a plurality of data items. It will take more time for the conventional information processing device to perform instructions.

In order to avoid this drawback of the conventional information device 1100 described above, there is a conventional information processing device 1200 having a configuration which is capable of reading two data items per one cycle.

FIG. 12 is a block diagram showing the configuration of the conventional information processing device 1200 as the second conventional example.

The difference between the conventional information processing device 1100 and the conventional information processing device 1200 is that the following circuit components are further incorporated in the information processing device 1200 in order to read data items simultaneously: an arithmetic logic unit (ALU) 15b; an input latch 13 for the ALU 15b; a memory access register (MAR) 23a and a MAR 23b; and a control circuit (not shown) which is incorporated in DEC 5.

When these circuit components are built into the configuration of the information processing device 1100, two data items can be read under a predetermined control.

Next, the operation of the conventional information processing device 1200 will be explained. Although the configurations of both devices 1100 and 1200 are different, this operation of the device 1200 is basically the same as that of the conventional information processing device 1100.

In the EX stage, an address calculation is performed by the ALU 15a and ALU 15b based on the control signal ALUC, so that the ALU 15a and ALU 15b generate two memory addresses. As a result, two data items can be read per one cycle simultaneously in the memory accessing (MA) stage.

Although it can read two data items per one cycle in the configuration of the information processing device 1200 described above, it must further require the added circuit components such as the ALU 15b, the input latch 13b, MAR 23b, MDR 27b in addition to the configuration of the information processing device 1100.

Because the hardware components added into the information processing device 1200 become greater than the circuit components in the information processing device 1100, it is difficult to comply with needs and requirements such as a miniaturization and a light-weight requirement and electric power is consumed more in the information processing device 1200 than that of the information processing device 1100. This is a problem.

SUMMARY OF THE INVENTION

Accordingly, an object of the present invention is, with due consideration to the drawbacks of the conventional information processing devices, to provide an information processing device which is capable of generating a plurality of data addresses and of performing read-out/write-in operations for a plurality of data items at the same time (load/store operations for a plurality of operands) without considerable increase of hardware components.

In accordance with a preferred embodiment of the present invention, an information processing device comprises: an instruction input section for receiving an instruction code to be processed; an instruction decode section for decoding the instruction code stored in the instruction input section and for generating an operand and control signals and for transferring the operand and the control signals; an instruction division control section for generating division control signals based on the control signals generated by the instruction decode section; an operand selection section for dividing at least the operand stored in instruction decode section or an operand stored in an arithmetic result storing section to store an arithmetic result of arithmetic operation into a plurality of operand parts based on the division control signal transferred from the instruction division control section; an arithmetic section for dividing the operand parts transferred from the operand selection section into a plurality of operand items each having a desired bit width based on the division control signal transferred from the instruction division control section and for performing arithmetic operations of the divided operand items at the same time and for transferring arithmetic results; the arithmetic result storing section for storing arithmetic results and the data items transferred from a memory access control section to be used for an memory access operation to a memory, and for transferring the arithmetic results and the data items to the operand selection section; and the memory access control section for receiving addresses transferred from the arithmetic section to be used for the memory access operation to the memory, for transferring the addresses for the memory and division control signals and for transferring the data items obtained from the memory to the arithmetic result storing section.

In accordance with a further aspect of the information processing device of this embodiment described above, the memory access control section comprises: address output means for dividing and transferring the address into a plurality of bit address parts each having a desired width when the number of the arithmetic results is one, and for generating each of the addresses of the arithmetic results when the number of the arithmetic results is not less than one; division control signal output means for generating and transferring the division control signals; and a plurality of data input means for receiving and storing the data items which is read from the memory.

In accordance with a further aspect of this embodiment described above, the arithmetic section comprises: carry line cut means for halting a carry propagation of at least one bit to a higher order bit based on the division control signal when the division control signal indicates that the instruction code is an divisional instruction, wherein a plurality of addresses in the memory to be accessed are calculated at the same time in parallel by the arithmetic section.

In accordance with a further aspect of the information processing device of this embodiment described above, the arithmetic section comprises address calculation means for calculating the operand transferred from the operand selection section and for transferring a calculated result, carry line cut means for stopping a carry propagation of at least one bit to a higher order bit based on the division control signal when the division control signal indicates that the instruction code is an divisional instruction, and specified arithmetic execution means for executing a specified arithmetic operation, wherein the specified arithmetic operation and the arithmetic operation can be carried out simultaneously.

In accordance with a further aspect of the information processing device of this embodiment described above, the arithmetic section comprises address calculation means for calculating the operand transferred from the operand selection section and for transferring a calculated result, carry line cut means for stopping a carry propagation of at least one bit to a higher order bit based on the division control signal when the division control signal indicates that the instruction code is an divisional instruction, and specified arithmetic execution means for executing a specified arithmetic operation, wherein the specified arithmetic execution means can be separated from the information processing device.

In accordance with a further aspect of the information processing device of this embodiment described above, the memory is made up of a pair of 16 bit memory sections, each 16 bit memory section is accessed per a 16 bit data item, the arithmetic section generates addresses to be transferred to the pair of memory sections, and the pair of 16 bit memory sections are accessed based on the addresses generated by the arithmetic section.

In accordance with another preferred embodiment of the present invention, an arithmetic information processing device comprises: arithmetic means for performing an arithmetic operation with the maximum bit widths of the information processing device; memory access means for accessing data items stored in a memory by supplying arithmetic results onto a plurality of address buses each having a specified bit width; arithmetic means for independently executing arithmetic operations of specified bit widths on the plurality of address buses so that the sum of the bit widths of the plurality of address buses is not over the maximum bit width and generating arithmetic results; control means for transferring the arithmetic results onto the address buses and for transferring a control signal indicating that the arithmetic results on the address buses are addresses independently to each other, each having the predetermined bit width, wherein memory accessing are performed at the same time by using these addresses on the address buses.

In accordance with a further aspect of the information processing device of this embodiment described above, the control signal indicating that the arithmetic results are on the address buses is generated by using a decoded result of an instruction to be executed by the information processing device.

In accordance with a further aspect of the information processing device of this embodiment described above, inputs provided into the arithmetic means corresponding to each bit width are selected independently when arithmetic operations are performed by using the predetermined bit widths independently.

In accordance with a further aspect of the information processing device of this embodiment described above, when the predetermined number of the memory access operations are performed simultaneously, the data buses that is used during the normal operation mode are used by dividing the data buses with a predetermined number so that the divided data buses are used independently to each other.

In accordance with another preferred embodiment of the present invention, an arithmetic information processing system comprises: an instruction input section for receiving an instruction code; an instruction decode section for decoding the instruction code received by the instruction input section, for generating operands and control signals and for transferring them; an instruction division control section for generating division control signals based on the control signals generated by the instruction decode section; an operand selection section for dividing the operand at least stored in the instruction decode section or an arithmetic result storing section to store the arithmetic result into a plurality of operand parts each having a specified bit width; an arithmetic section for dividing the plurality of operand parts transferred from the operand selection section into parts each part having a specified bit width based on the division control signal transferred from the instruction division control section, for executing arithmetic operations of the divided operand parts at the same time and for transferring arithmetic results; the arithmetic result storing section for storing data transferred from the arithmetic section and data transferred form the memory access section to control the access operation to the memory section and for transferring the data to the operand selection section; a plurality of address output sections for dividing an address into parts each having a specified bit width and for transferring the parts when the arithmetic result of the arithmetic section is one, and for transferring addresses corresponding to the arithmetic results when the arithmetic results is not less than two; division control signal output section for transferring the division control signals; a plurality of data input means for storing data read from the memory section; an information processing section for transferring the data obtained from the memory to the arithmetic result storing section; a bus control unit section for receiving addresses from the other address output means other than one address output means in the plurality of address output means and the division control signal and for switching the addresses obtained from the other address output means based on the division control signal; a first memory region for receiving the address transferred from at least one address output means in the plurality of address output means, for dividing the data stored in the memory section indicated by an address which is made by combining the address from the address output means with the address transferred from the bus control unit section when the address is transferred from the bus control unit section, and for transferring the divided data items to one data input means in the plurality of input means and the other data input means; and second memory regions of at least two or more for receiving the address transferred from the other address output means and the division control signal and for transferring the data stored in the memory indicated by the address based on the division control signal into the other data input means.

In accordance with a further aspect of the information processing system of this embodiment described above, the memory section comprises a pair of memory regions each of which is accessed per a 16 bit width.

In accordance with a further aspect of the information processing system of this embodiment described above, the memory section comprises four memory regions each of which is accessed per a 16 bit width.

As described above, in the information processing device of the present invention, an arithmetic unit is divided into a plurality of sections so that a plurality of addresses of data items can be generated and a control signal indicating that the plurality of addresses are supplied is generated. Therefore a plurality of operand load/store operations can be performed at the same time by transferring the control signal and the plurality of addresses into the memory section.

In addition, the memory access control section can divide the address into a plurality of addresses and transfer the divided addresses when the number of the arithmetic result of the arithmetic section is one. When the number of the arithmetic result of the arithmetic section is not less than two, each address is given to each arithmetic result and data input operations from the memory section can be performed at the same time by using the divided addresses. Accordingly, buses through which addresses and data are transferred can be commonly used in both cases that the arithmetic section is divided and not divided.

Further, because the carry line halt means to halt a carry propagation to an upper bit section is incorporated in the arithmetic section, the arithmetic section can be commonly used in use of instructions in which the arithmetic section is divided and not divided.

In addition, because a specified arithmetic execution means to execute special arithmetic operations can be separated from the information processing device of the present invention, the information processing device of the present invention can be used for many types of arithmetic requirements such as a multiplication operation and an addition operation. Furthermore, because the specified arithmetic execution means can be exchanged easily, the information processing device is capable of dealing with design changes or grade-up requirements in future.

Moreover, in the information processing device of a second configuration as another aspect of the present invention, because arithmetic operations for data items each having a predetermined bit width that is within the maximum bit width of this information processing device are performed independently to each other in order to obtain a predetermined number of arithmetic results, a plurality of addresses for data items can be generated and a plurality of data read/write operations (a plurality of operand load/store operations) can be executed with increasing of a smaller hardware size required to realize the above function. In this case, because the control signal indicating that a plurality of addresses of a specified number are on the address bus can be generated by the decode result of an instruction code, users can make programs without considering the hardware configuration of the information processing device of the present invention. Thereby, the efficiency of a software development works to design software programs can be increased.

In addition, in the present invention, because the inputs to the arithmetic unit each input having a specified bit width can be selected independently, the address calculation operations can be performed independently to each other.

Further, because the data bus used in the normal operation mode is divided into many buses each bus having a predetermined bit width when the memory accessing operation are performed with a predetermined addresses, a plurality of addresses for data items can be generated and a plurality of data read/write operations (a plurality of operand load/store operations) can be executed with increasing of a small hardware size required to realize the above function.

In addition, in the information processing system of a third configuration as another aspect of the present invention, the memory section has the first memory section and the second memory section. The first memory section divides the data stored in the memory section indicated by an address which is made by combining the address from the address output means with the address transferred from the bus control unit section when the address is transferred from the bus control unit section, and transfers the divided data items to one data input means in the plurality of input means and the other data input means. The second memory regions of at least two or more receive the address transferred from the other address output means and the division control signal and transfer the data stored in the memory indicated by the address based on the division control signal into the other data input means. By the configuration described above, a plurality of addresses for data items can be generated and a plurality of data read/write operations (a plurality of operand load/store operations) can be executed with increasing of a smaller hardware size required to obtain the above function.

Furthermore, the data bus can be commonly used because the data stored in the memory section indicated by an address which is made by combining the address of the address output means with the address transferred from the bus control unit section is divided, and the divided data items are transferred to one data input means in the plurality of input means and the other data input means.

These and other objects, features, aspects and advantages of the present invention will become more apparent from the following detailed description of the preferred embodiments of present invention taken in conjunction with the accompanying drawings.

BRIEF DESCRIPTION OF THE DRAWINGS

FIG. 5 is a diagram showing an example of a program used in the operation of the information processing device of the first embodiment as shown in FIGS. 2 and 3 and also used in other embodiments.

FIG. 6 is an explanation diagram showing an example of a pipelined process executed by the information processing device of the first embodiment shown in FIG. 2.

FIG. 14 is an explanation diagram showing an example of pipelined processes executed by the conventional information processing device shown in FIG. 12.

DESCRIPTION OF THE PREFERRED EMBODIMENTS

Other features of the present invention will become apparent through the following description of preferred embodiments which are given for illustration of the present invention and are not intended to be limiting thereof.

First, we will describe the basic concept or the outline of the present invention.

The information processing device of the present invention has the following features. The information processing device of the present invention has the configuration of the following five pipelined stages which is also commonly used in a processor of a Reduced instruction set computer (RISC):

IF stage: It is a stage to fetch an instruction code and to set the fetched instruction code into an instruction register (IR) from a memory;

ID stage: It is a stage to decode the instruction code stored in the IR and to generate the register number, a displacement (disp.), and the like;

EX stage: It is a stage to execute an arithmetic operation or to generate addresses to be used for a memory access operation;

MA stage: It is a stage to access the memory; and

WB stage: It is a stage to write data into registers.

Figure 1:
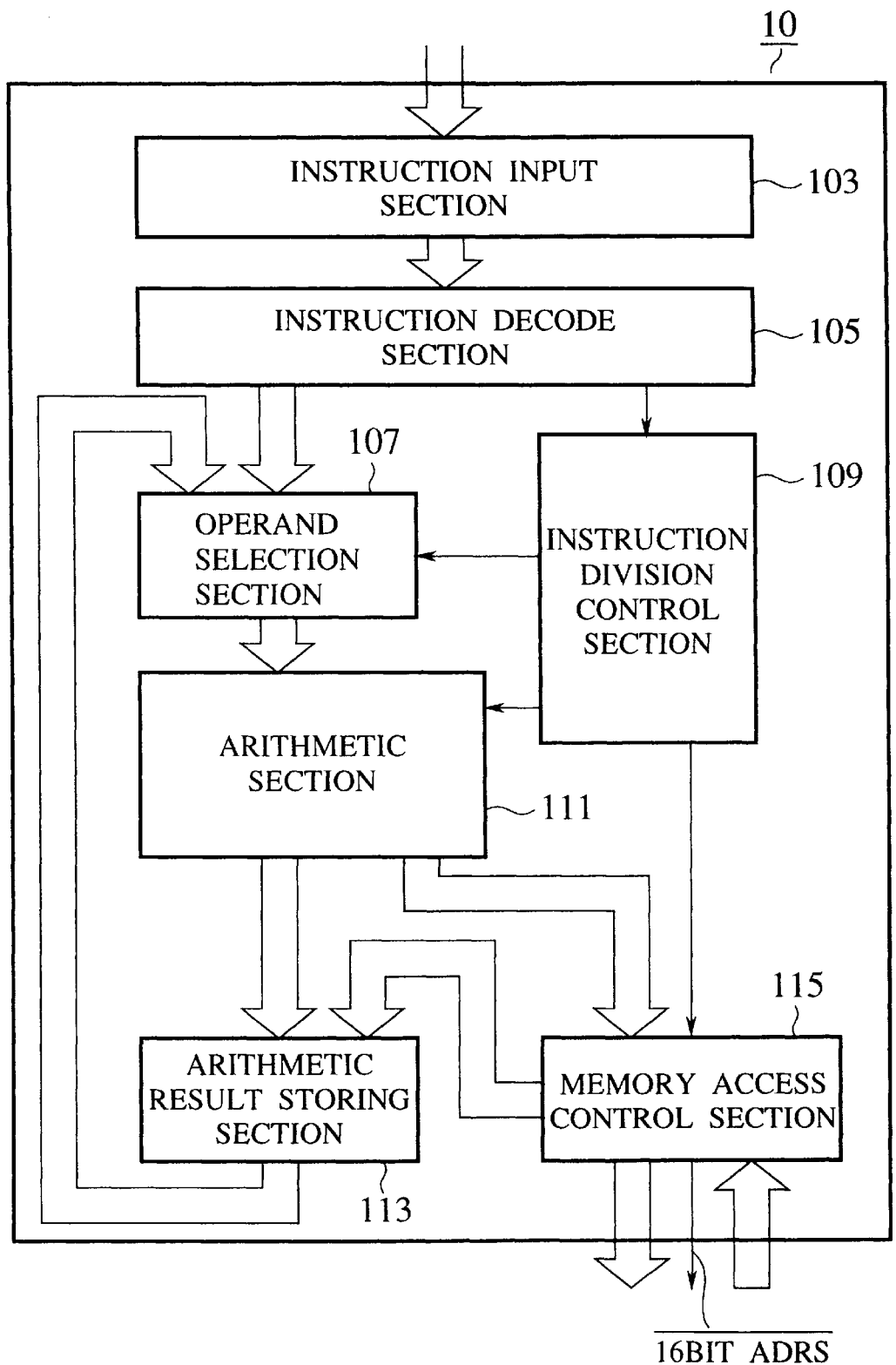
FIG. 1 is a block diagram showing the conceptual configuration of an information processing device of the present invention.

FIG. 1 is a block diagram showing the conceptual configuration of the entire of an information processing device 10 of the present invention.

The information processing device 10 comprises an instruction input section 103 for receiving and storing an instruction code to be accessed, an instruction decode section 105 for decoding the instruction stored in the instruction input section 103 and for generating and transferring operands and control signals, an instruction division control section 107 for transferring instruction division signals based on the division control signals generated by the instruction decode section 105, an operand selection section 107 for transferring the operands from the instruction decode section 105 or an arithmetic result storing section 113 based on the instruction division signal transferred from the instruction division control section 109, an arithmetic section 111 for dividing the operand from the operand selection section 107 into operand parts each having a specified bit width, for executing the divided operand parts and for transferring arithmetic results, the arithmetic result storing section 113 for storing the arithmetic results from the arithmetic section 111 and the data transferred from a memory access control section 115 and for transferring the data into the operand selection section 107, and the memory access control section 115 for receiving the addresses with which a memory is accessed from the arithmetic section 111, for transferring the addresses and the instruction division signals to the memory and for transferring the data from the memory into the arithmetic result storing section 113.

Next, the operation of the information processing device 10 having the configuration shown in FIG. 1 according to the basic concept of the present invention will be explained.

First, in the IF stage (instruction fetch block), an instruction code is fetched. The instruction code is an instruction to execute load operations for a plurality of operands. The instruction code is stored into a register or the like in the instruction input section 103. The instruction decode section 105 decodes the instruction code stored in the instruction input section 103. The instruction division control section 109 generates division control signals based on the decoded result from the instruction decode section 105. The generated division control signals are transferred into various sections, for example, into the operand selection section 107, the arithmetic section 111, the memory access control section 115 and the like.

Here, it can be acceptable that the division control signal indicates only the divisional operation, the non-divisional operation, or a control operation to control each section. In the last case, each control signal to be transferred to each section can be different instruction to each other.

This division control signals are transferred to the operand selection section 107, arithmetic section 109, and the memory access control section 115, respectively.

The operand selection 107 selects and transfers a required operand to be executed by the arithmetic section 111 in the operands decoded by the instruction decode section 105 and the operands stored in the arithmetic result storing section 113.

In the information processing device 10 of the present invention, the operand to be transferred to the operand selection section 107 is used in the operand decoded by the instruction decode section 105 and the operand stored in the arithmetic result storing section 113. The present invention is not limited by these kinds of operands. For example, it can be acceptable to use data (or operands) directly transferred from the memory access control section 115 and operands transferred from the arithmetic section 111, the instruction input section 103 and the like.

Next, the arithmetic section 111 generates (or calculates) a plurality of addresses by using the operand selected by the operand selection section 107 and a displacement data in an instruction code selected by the operand selection section 107. The plurality of addresses from the arithmetic section 111 as the arithmetic results are transferred into the memory access control section 115 and then latched by a memory address register incorporated in the memory access control section 115. Then, the latched addresses are transferred to the address bus.

In the information processing devices 100, 200 as the first and second embodiments according to the present invention that will be explained later, an ALU of a 32 bit width is used and the ALU is divided into two sections. In addition, these two sections of the ALU each having a 16 bit width in size are capable of performing arithmetic operations simultaneously.

Hereinafter, the explanation relating to address calculation operations of a core processor in the information processing devices according to the present invention will be mainly described.

EMBODIMENT 1

Figure 2:
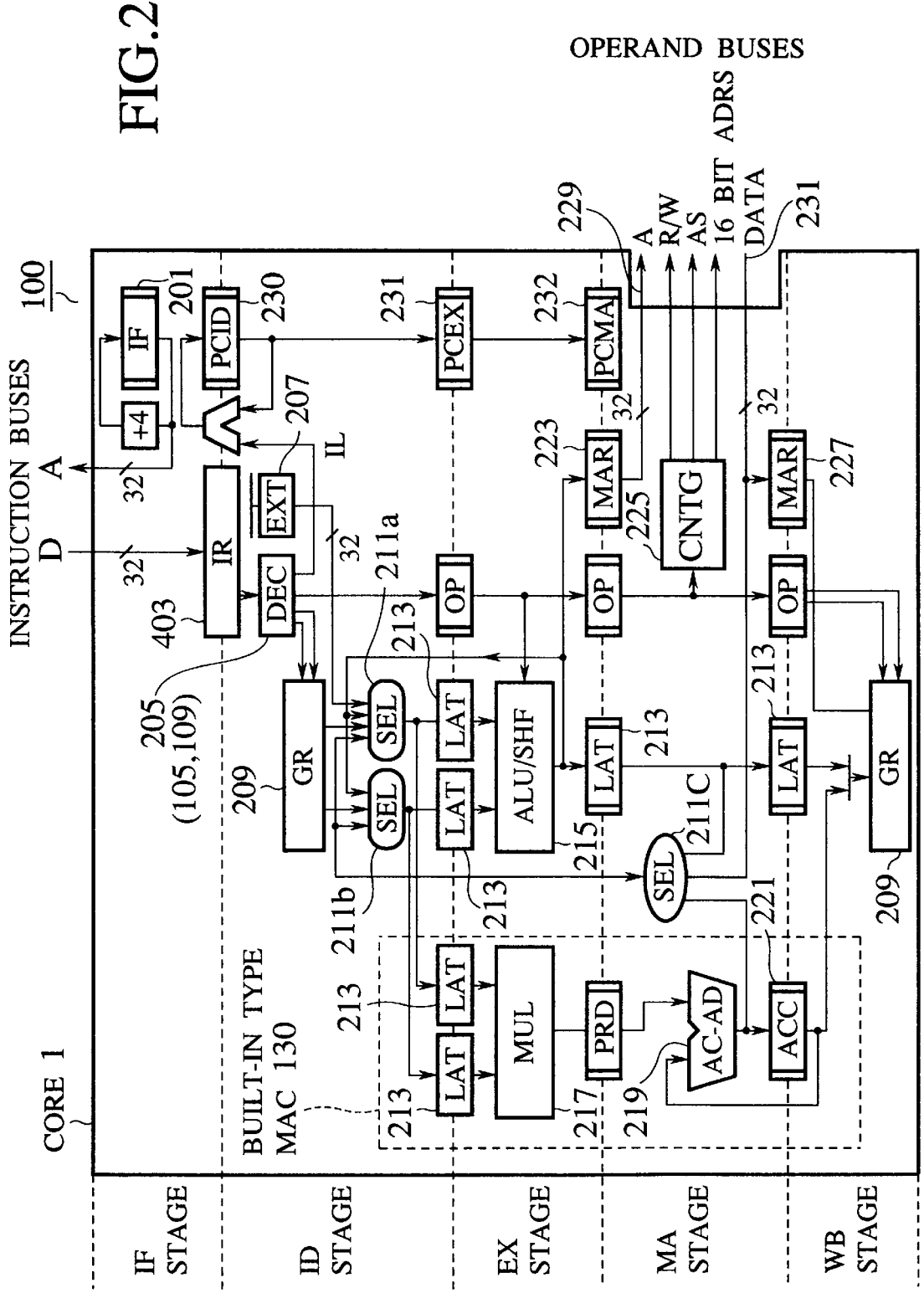
FIG. 2 is a block diagram showing a circuit configuration of the information processing device of a MAC built-in type as the first embodiment of the present invention.

FIG. 2 is a block diagram showing a circuit configuration of the information processing device 100 of a MAC (a Multiple/Accumulator) built-in type as the first embodiment of the present invention. FIG. 2 shows mainly a core processor (CORE1) 1 in pipelined stages of the information processing device 100 of the first embodiment.

In the explanation of the information processing device 100 of the first embodiment, we will describe mainly about the core processor (CORE1) 1 for performing address calculations.

As shown in FIG. 2, the information processing device 100 of the first embodiment comprises an instruction register (IR) 203 for receiving an instruction code to be accessed, an instruction decoder (DEC) 205 for receiving the instruction code stored in the IR 203 for decoding and for generating and transferring various kinds of control signals, a sign extension unit (EXT) 207 for extending the sign of a displacement data in the instruction code stored in the IR 203, a general purpose register (GR) 209, two selectors (SELs) 211a and 211b for selecting either data in the GR 209 or data in the EXT 207, an arithmetic logic unit (ALU) 215, a memory address register (MAR) 223 for latching address data generated by the ALU 215, a memory data register (MDR) 227 for latching data read out from a memory (not shown), an address bus group (hereinafter referred to as "ABUS") 229, and a data bus group (hereinafter referred to as "DBUS") 231. The MAC 130 is incorporated in the core processor CORE 1 in the information processing device 100 of the first embodiment.

The information processing device 100 of the first embodiment has the configuration to execute two memory access operations for predetermined instructions (for example, a multiplication arithmetic operation, an addition arithmetic operation, an MLD instruction which will be explained with reference to FIG. 6, and the like) at the same time. In order to perform this, a multiplication arithmetic operation is executed in the EX stage by using a multiplication logic unit (MLU) 217 and an addition arithmetic operation is performed in the MA stage by using an adder 219 and an accumulator 221.

In addition, because the IF 201 stores the address of an instruction code to be fetched in the following operation, the IF 201 is referred to as a program counter (PC), in general. The information processing device 100 of the first embodiment has a PID 230, a PCEX 231 and a PCMA 232 in which addresses of the instruction codes that are currently executed in each of the pipelined stages are stored.

In order to fit both cases, required memories are formed on a semiconductor chip or not formed on a single semiconductor chip, it can be acceptable to design a cache memory which is separated in configuration from the core processor (CORE1) 1 and electrically connected to the CORE 1 at an external section of the CORE 1.

In addition, it can be acceptable that the instruction bus group is separated from the operand bus group formed on a semiconductor chip in order to keep a required performance of the information processing device and to reduce a power consumption of it.

Next, the address generation method in the information processing device 100 of the first embodiment will be explained with reference to FIG. 3.

Figure 3:
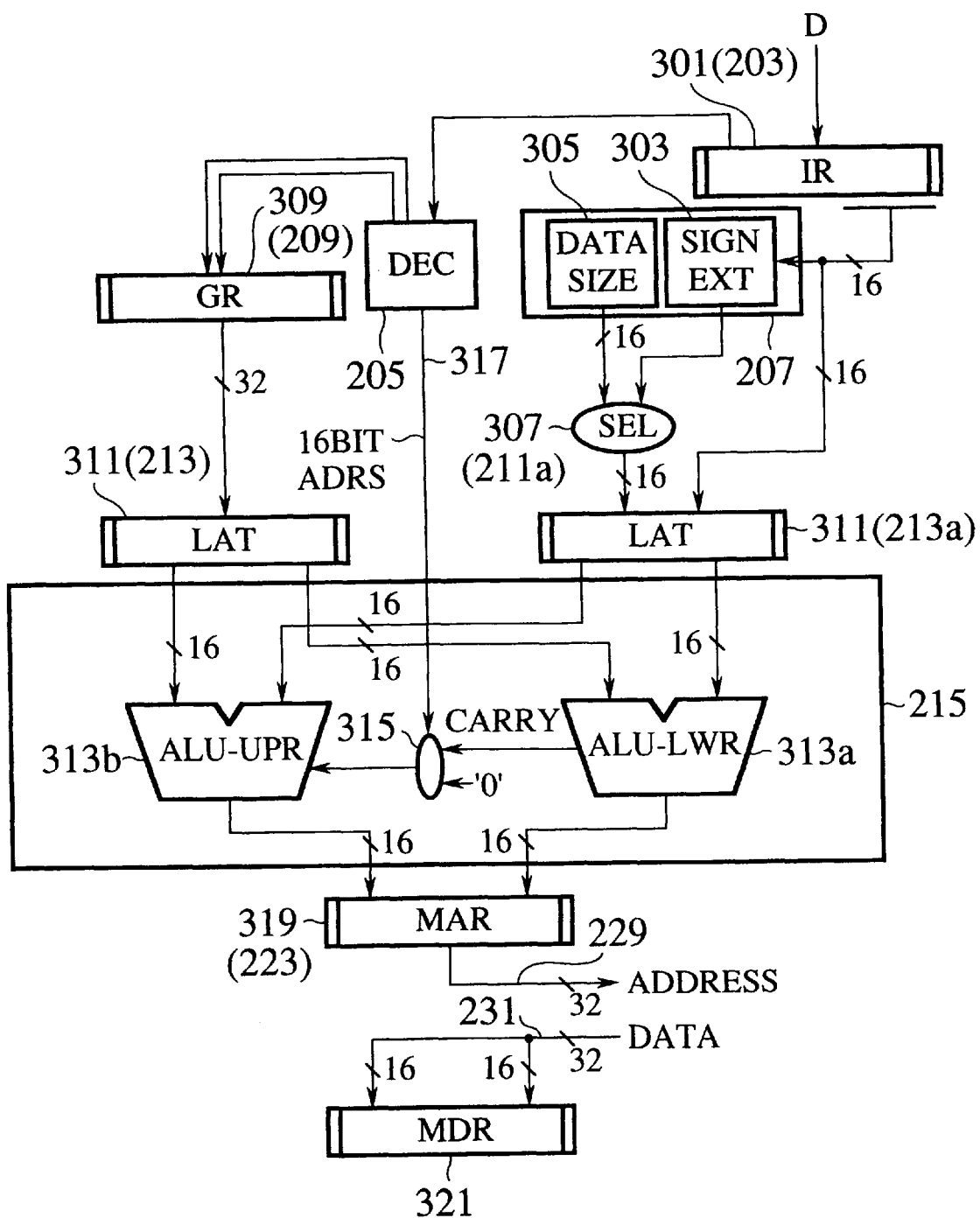
FIG. 3 is a detailed segmentary view for explanation of an address generation method of the information processing device as the first embodiment shown in FIG. 2.

FIG. 3 is a detailed segmentary view for explanation of the address generation method of the information processing device 100 as the first embodiment shown in FIG. 2. In FIG. 3, reference numbers in parentheses (for example, the reference number 311 (213a in FIG. 2)) indicate the corresponding same components which are also used in the information processing device 100 shown in FIG. 2.

The configuration shown in FIG. 3 indicates the required components for the following explanations.

The ALU 215 shown in FIG. 2 comprises an upper side arithmetic logic unit (ALU) 313b, the lower side arithmetic logic unit (ALU) 313a, and a carry propagation cut means 315 for the LAU 313a.

When a normal instruction executes (which can be also executed by the conventional information processing devices), the upper 16 bits and the lower 16 bits of the ALU 313a and 313b are connected. That is, a carry is propagated from the lower 16 bit side to the upper 16 bit side in the ALU 313a and 313b if required. In this case, the LAU 215 executes a normal 32 bit addition instruction. Data in the GR309 (209) is added to a displacement (disp.) of 16 bits that has been extended in sign. The addition result (designated by the reference character "ADDRESS" in FIG. 3) is stored into the MAR 319 (223) and transferred onto the ABUS 229.

Data corresponding to the above addition result is transferred and stored into the MDR 321 through the DBUS 231 (designated by the reference character "DATA" in FIG. 3) when a bus cycle is completed.

In the explanation with reference to FIGS. 5 and 6 which will be described later, an instruction MLD and an instruction MAC and the like are used. In execution of these instruction, no carry is propagated toward the upper ALU 313b from the lower ALU 313a by the carry propagation cut means 315 based on the control signal transferred from the DEC 205. That is, the ALU 313a and the ALU 313b are performed independently to each other. A data size is set into the upper 16 bits in the GR 309 and the disp. is set into the lower 16 bits in the GR 309. The cut of the carry propagation indicates the execution of the specified instructions MLD, MAC and the like (special multiplication and addition instructions). Both arithmetic results, the 16 bit addresses, are stored into the MAR 319, then separated into the upper group and the lower group of the address bus group (ABUS) 229, and transferred externally through the ABUS 229. Data corresponding to these addresses are stored into the MDR 321 through the upper 16 bits and the lower 16 bits in the data bus (DBUS) 231.

On the other hand, during memory accessing operations caused by the multiplication and addition instruction, the division control signal 16bitADRS is generated by the DEC 205 and transferred to the carry propagation cut means 315 through the bus 317. This division control signal 16bitADRS indicates that an address on the address bus group 229 is separated and treated independently to each other. This control signal 16bitADRS and other bus control signals (AS, RW and the like) are generated while the multiplication and addition arithmetic instruction is in the pipelined MA and ID stages, especially the control signal 16bitADRS is generated from an OP code in an instruction stored in the IR 301.

By using the configuration of the information processing device 100 of the first embodiment, when data area used for the multiplication and addition arithmetic instruction is a relatively small bit size (not a large bit size), the carry propagation cut means 315 (namely, the selector that is made up of NAND gates), a logic circuit to transfer the division control signal 16bitADRS in synchronism with a bus cycle, and the selectors 211a and 211b can be performed at the same time. This means that two bus cycles are completed. These operations are, for example, the multiplication and addition arithmetic instruction, carried out within one clock cycle.

Figure 13:
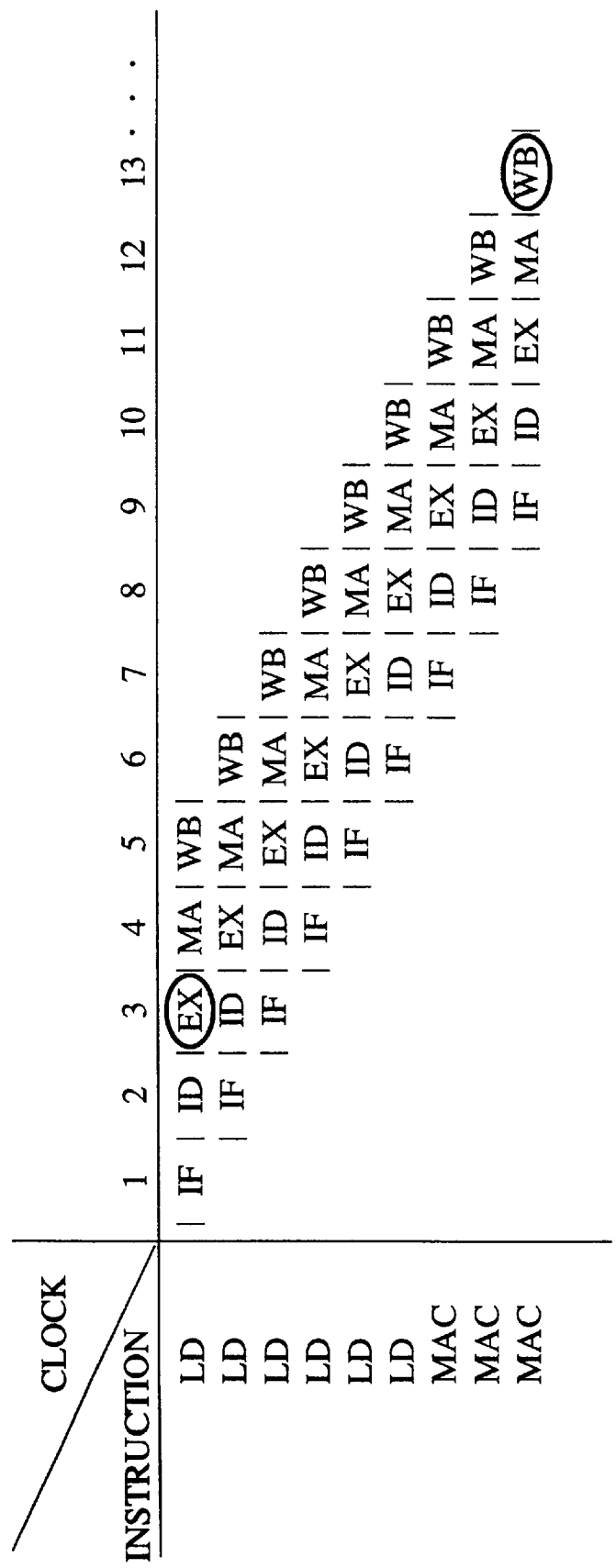
FIG. 13 is an explanation diagram showing an example of pipelined processes executed by the conventional information processing device shown in FIG. 11.

Accordingly, without considerable increase in hardware size in addition to the configuration of the conventional information processing device as shown in FIG. 13, the information processing device of the present invention can achieve to execute a plurality of operand load/store processes.

Basic multiplication and addition arithmetic instructions used in the information processing device of the first embodiment will be explained as follows. In each case, an instruction format of 32 bit width having a displacement "disp." of 16 bit is used.

Double load instruction (MLD): reg1, reg2, disp., where, reg1 is a pointer used for a memory access, reg2 is a load register, and a disp is added to the lower order bits of reg.1.

The operations of this instruction MLD in each pipelined stage are as follows:

EX stage: two addresses are generated;

MA stage: memory accessing is executed; and

WB stage: a renewed address is stored into reg1.

Double multiplication and addition arithmetic instruction 1 (MAC1): reg1, reg2, disp., where reg1 is a pointer used for a memory access, reg2 is a load, a readout register, and a disp is added to the lower order bits of reg.1.

The operations of this instruction MAC1 in each pipelined stage are as follows:

EX stage: two addresses are generated, the upper section and the lower section of GR designated by reg2 are multiplied;

MA stage: memory accessing is executed, PRD (multiplication result) and data in ACC (accumulator) are added; and WB stage: data is loaded into the register designated by reg2, and a renewed address is stored into reg1.

Double multiplication and addition arithmetic instruction 2 (MAC2): reg1, reg2, where reg1 is a register to store data in ACC and reg2 is a register for read out.

The operations of this instruction MAC2 in each pipelined stage are as follows:

EX stage: the upper section and the lower section of GR designated by reg2 are multiplied; and MA stage: PRD (multiplication result) and data in ACC (accumulator) are added, only the multiplication and addition arithmetic operation in MAC1 is executed in MAC2.

Next, a program, as shown in FIG. 5, is executed by using the specified instructions described above such as MLD, MAC1 and MAC2 in the information processing device 100 of the first embodiment.

FIG. 5 shows an example of a program used in the operation of the information processing devices 100 of the first embodiment as shown in FIGS. 2 and 3. FIG. 6 is an explanation diagram showing an example of a pipelined process executed by the information processing device 100 of the first embodiment as shown in FIG. 2.

Hereinafter, we will describe the case in which the program shown in FIG. 5 is executed by the information processing device 100 of the first embodiment as shown in FIG. 2.

The program shown in FIG. 5 is compiled and changed into instruction codes such as MLD, MAC1 and MAC2 as shown in FIG. 6. In order to translate the program shown in FIG. 5 into the specified instructions shown in FIG. 6, a compiler which is capable of converting a program into specified instructions which can be executed by the information processing device of the present invention must be used.

In FIG. 6, the MLD instructions are executed twice and the MAC instruction is also executed three times. Then, the arithmetic results are stored into the general purpose register GR in pipelined process.

As shown in FIG. 6, a time period between the EX stage in which the first MLD is executed and the time at which the arithmetic result is stored into the register requires seven clocks (the time is that the following instruction can read out this arithmetic result stored in the register).

In FIG. 6, the time period is from the clock 3 (EX stage) to the clock 9 (WB stage) which is the seventh clocks counted from the clock 3.

Figure 11:
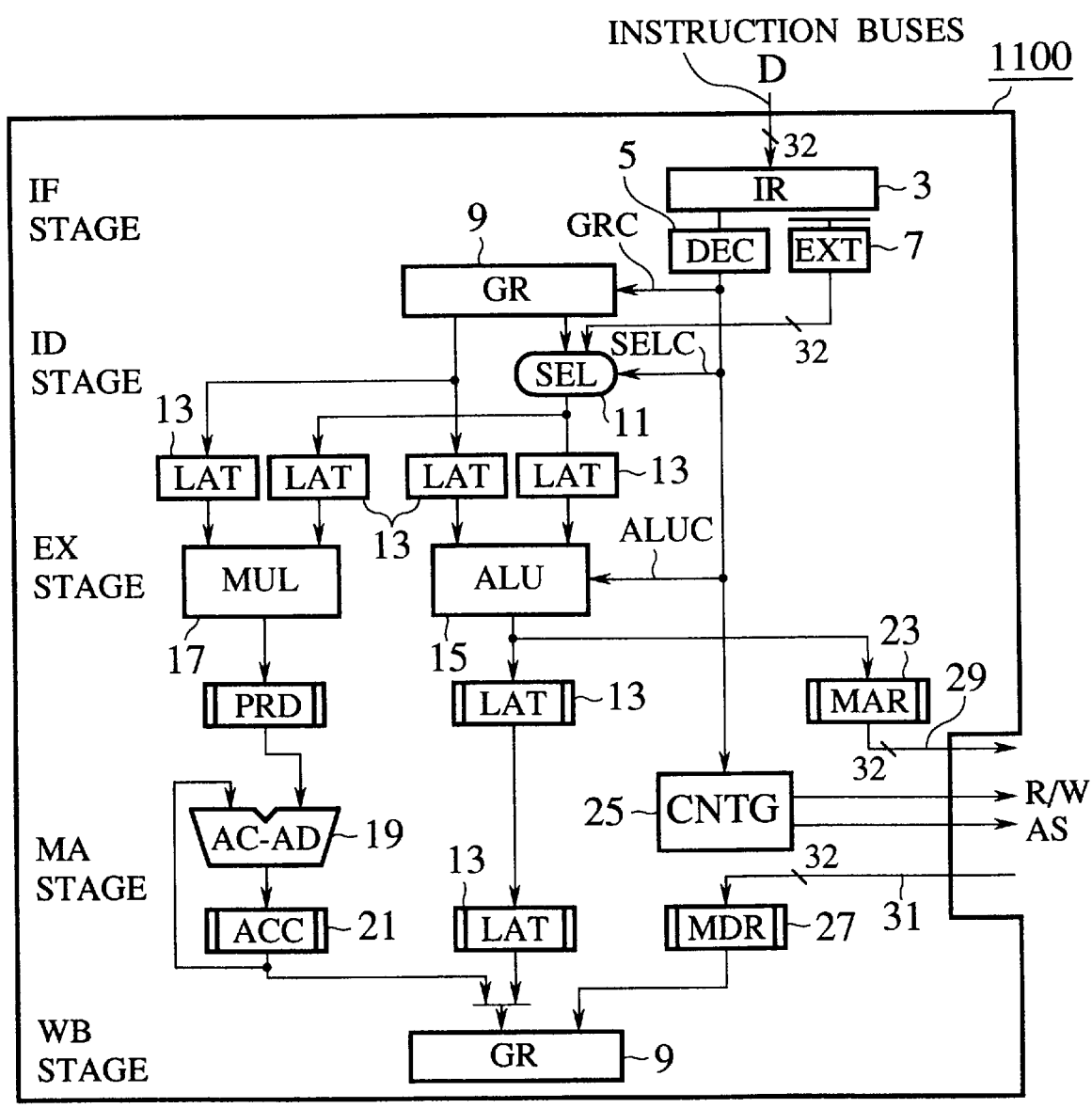
FIG. 11 is a block diagram showing a configuration of a conventional information processing device.

FIG. 13 is an explanation diagram showing an example of pipelined processes executed by the conventional information processing device 1100 as shown in FIG. 11. The instructions shown in FIG. 13 that can be executed by the conventional information processing device 1100 are instructions which have been obtained by compiling the program shown in FIG. 5 by a conventional compiler.

When comparing the execution results of the information processing device 100 of the first embodiment of the present invention as shown in FIG. 5 and the conventional information processing device 1100, the conventional information processing device 1100 requires at least 11 clocks counted from the starting time of the execution of the load instruction (LD) in the pipelined EX stage (clock 3) to the time designated by the clock 13 at which the arithmetic result is stored into the register (the time is that the following instruction can read this arithmetic result stored in the register).

For example, a FIR filter arithmetic operation is executed 10 times (the multiplication and addition arithmetic operation is executed 10 times) by both the information processing device 100 of the first embodiment and the conventional information processing device 1100 shown in FIG. 11.

As a result, although the conventional information processing device 1100 shown in FIG. 11 must require 32 clocks (including two clocks of the initialization of ACC and the store operation to a register), the information processing device 100 of the first embodiment requires only 13 clocks (including three clocks of the initialization of ACC and two clocks required for execution of the MLD instruction).

Accordingly, the performance of the information processing device of the present invention becomes approximately three times of that of the conventional information processing device 1100.

Figure 12:
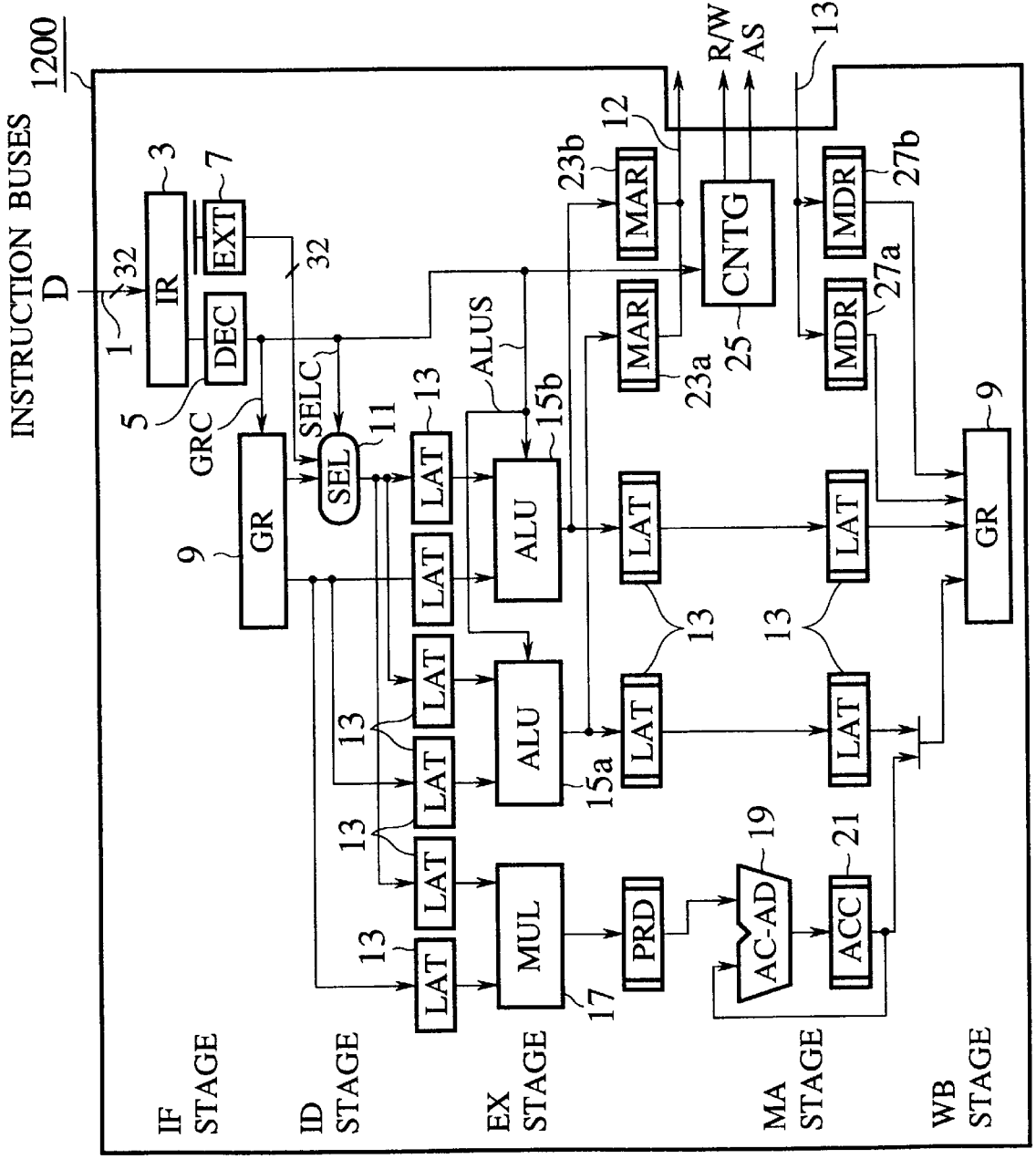
FIG. 12 is a block diagram showing another configuration of a conventional information processing device.

In addition, when comparing the information processing device 100 of the present invention with the conventional information processing device 1200 shown in FIG. 12, both have ability to execute a plurality of operand load/store processes at the same time, the hardware size of the information processing device 100 of the present invention is smaller than that of the conventional information processing device 1200. For example, the information processing device 100 of the present invention does not require or incorporate the ALU 15*b*, input latch 13 for the ALU 15*b*, the MAR 23*b*, the MDR 27*b* and control circuit therefor which are required for the conventional information processing device 1200 shown in FIG. 12. Thus, the information processing device of the present invention becomes small in configuration size and can reduce a power consumption.

As described above in detail, the information processing device 100 of the present invention can execute a plurality of operand load/store operations at a high speed without considerable increasing of a hardware size.

EMBODIMENT 2

Figure 4:
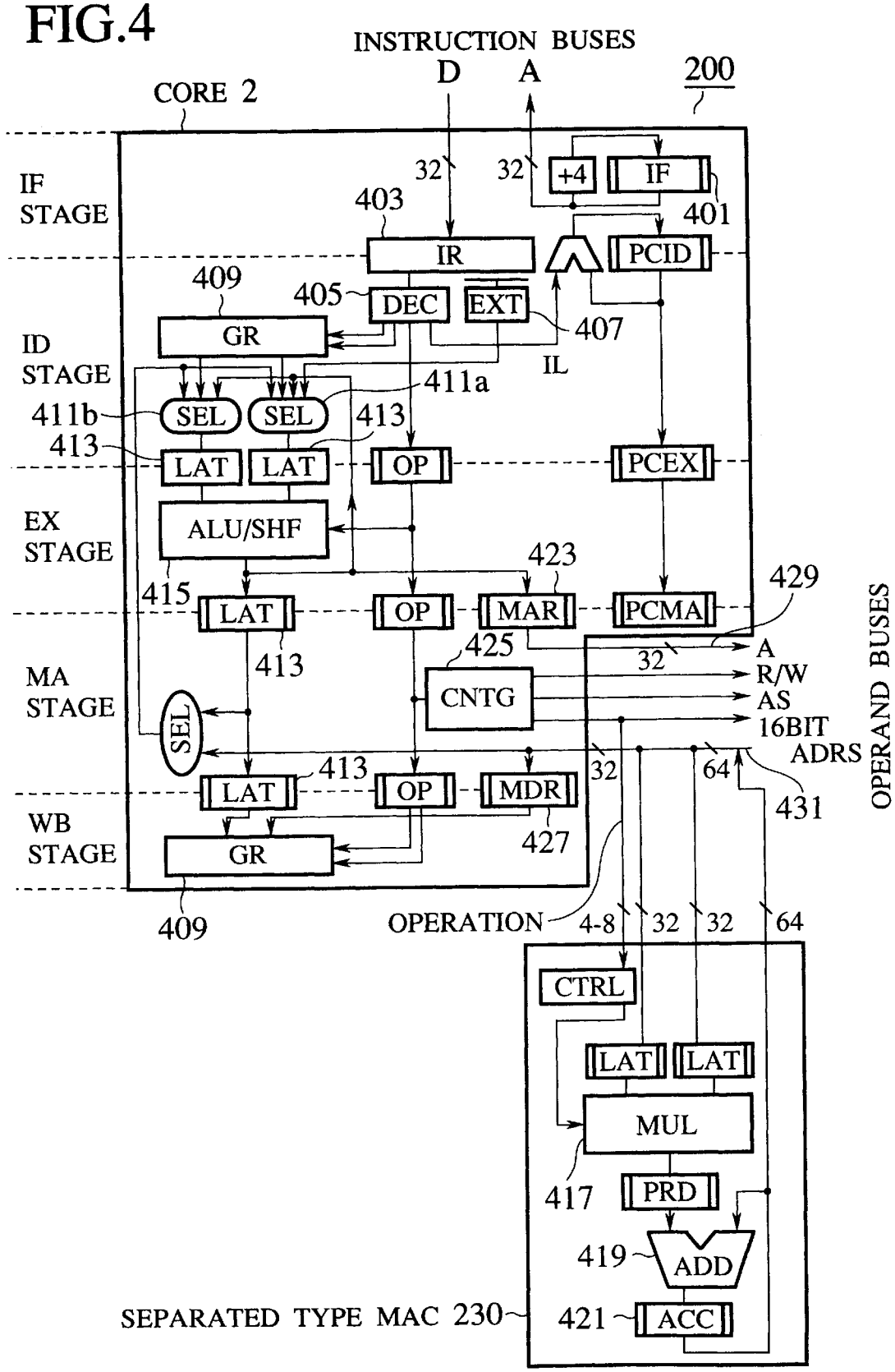
FIG. 4 is a block diagram showing a circuit configuration of the information processing device including a separated type MAC in which the separated type MAC is separated in configuration from a core processor as the second embodiment of the present invention.

FIG. 4 is a block diagram showing a circuit configuration of the information processing device 200 in which a MAC 230 is not incorporated in a core processor CORE 2, namely it is separated from the core processor CORE 2, as the second embodiment of the present invention.

Like the information processing device 100 of the first embodiment, the information processing device 200 of the second embodiment executes two memory access operations when executing specified instructions (such as a multiplication and addition arithmetic instruction).

In the information processing device 200 of the second embodiment, the multiple/Accumulator (MAC) 230 is separated from the core processor CORE 2. Hereinafter, this type is called to as "an exterior or separated type MAC".

By using the exterior type MAC, both data widths of the core processor CORE2 (a 32 bit width) and the MAC 230 (for example, a 64 bit width of a pair of 32 bit widths) can be determined independently.

In the MA stage, the operand fetch is carried out, a command indicating the type of the arithmetic instruction to be executed is transferred to the MAC 230. Because the address generation method is equal to that of the first embodiment, the explanation for the address generation method is omitted here.

When the multiplication and addition arithmetic instruction is executed, the data bus width is the 64 bit widths, and the MAC 230 receives both two data items each having the 16 bit widths. After this, the MAC 23 operates. In addition, while the memory access operation is based on the multiplication and addition arithmetic instruction, the CORE 2 generates and transfers the control signal to the MAC 230. This control signal indicates that data on the address buses is divided into two address data items, the upper 16 bits and the lower 16 bits, each having the 16 bit widths.

This control signal is generated by using the OP code in the instruction to be executed and the control signal and the other bus control signals AS and RW etc. are transferred during the execution of the multiplication and addition arithmetic instruction in the MA stage.

The basic operation of the multiplication and addition arithmetic instruction is as follows.

In the following explanation, the instruction format of the 32 bit widths having a pair of displacements (each having the 16 bit widths) is used.

Instruction MAC1: reg1, reg2, disp., where reg1 is a pointer used for a memory access, reg2 is a load register, and a disp is added to the lower order its of reg1.

The operations of this instruction MAC1 in each pipelined stage are as follows:

EX stage: two addresses are generated;

MA stage: a memory accessing is executed and a command is transferred to a MAC (a multiplier/Accumulator); and WB stage: a core loads data into the reg2 and the MAC executes a multiplication between the upper 16 bits and the lower 16 bits in the fetched data.

After the execution of the WB stage, the operations of the core 2 and the MAC 230 are performed independently to each other. Therefore the operation of the MAC 230 can be divided into a plurality of pipelined stages. In this case, one operation of the MAC per one clock can be achieved.

The following instruction in addition to the instructions described above is required for the information processing device 200 of the second embodiment.

Instruction STACC: Scr, dest.

This instruction STACC is used and data in a specified purpose register is stored, namely, the SRC (in the ACC 421) is written into the general purpose register (GR) 409 or a memory designated by the Dest.

Figure 7:
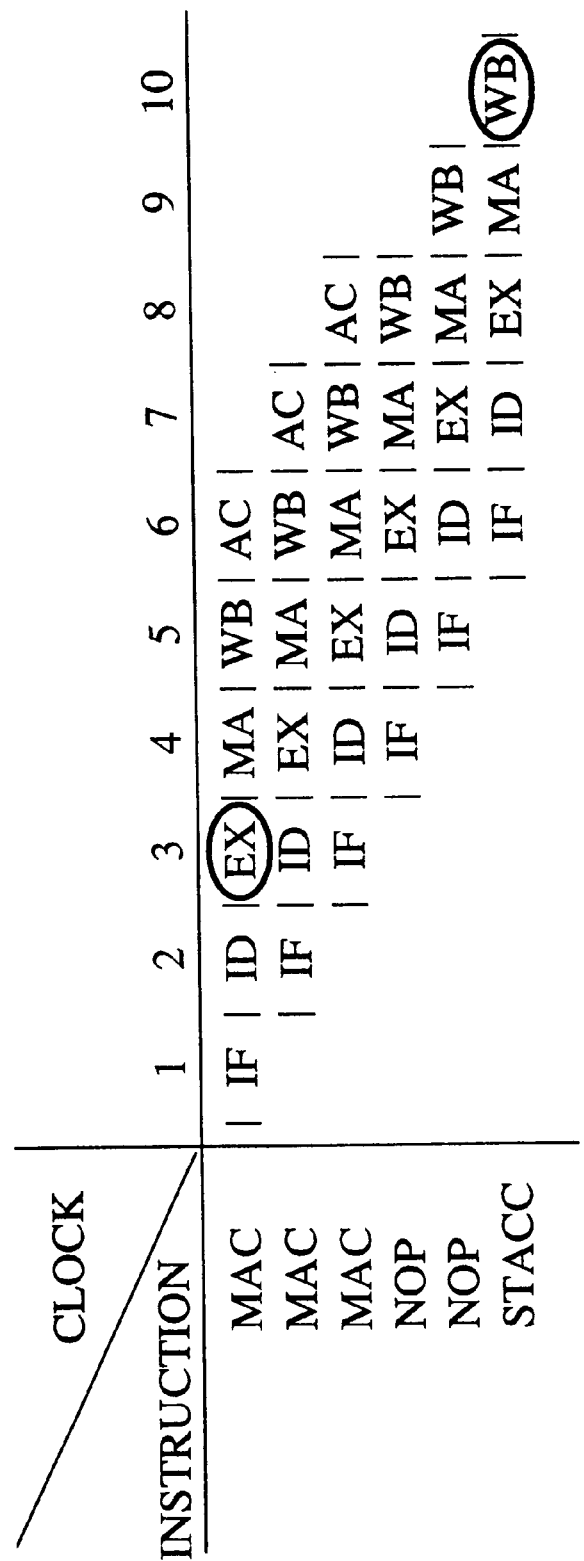
FIG. 7 is an explanation diagram showing an example of a pipelined process executed by the information processing device of the second embodiment, as shown in FIG. 4.

FIG. 7 is an explanation diagram showing an example of a pipelined process executed by the information processing device 200 of the second embodiment, as shown in FIG. 4.

FIG. 7 shows the instructions which have been translated into instruction codes which can be executed by the information processing device 200 of the second embodiment by compiling the program shown in FIG. 5. In order to translate the program shown in FIG. 5 into the specified instruction codes shown in FIG. 7, a compiler must be used. This compiler is capable of converting the program into specified instruction codes which can be execute by the information processing device 200 of the present invention.

As shown in FIG. 7, the MAC instruction is executed three times, and the arithmetic result is stored into the GR. In this case, the separated MAC 230 operates in pipelined stages and the addition arithmetic operation in the MAC instruction is executed in the EX stage.

As shown in FIG. 7, a time period between the start of the execution by the first MAC instruction (at the EX stage designated by the clock 3) and the WB stage (at the clock 10) at which the arithmetic result is stored into the register requires eight clocks (at the clock 10, the following instruction can read out this arithmetic result stored in the register).

FIG. 14 is an explanation diagram showing an example of pipelined processes executed by the conventional information processing device 1200 shown in FIG. 12. The instruction codes shown in FIG. 14 that can be executed by the conventional information processing device 1200 are instructions which have been obtained by compiling the program shown in FIG. 5 by a conventional compiler.

The first LD instruction shown in FIG. 14 loads data from a memory to a register, the following MAC instruction executes the multiplication and addition arithmetic operation between registers. The final instruction STACC stores the arithmetic result of the ACC into the register. The conventional information processing device 1200 requires at least 12 clocks counted from the start of the execution of the load instruction (LD) in the pipelined EX stage (at the clock 3) to the time designated by the clock 14 at which the arithmetic result of the ACC is stored into the register.

As described above, in the information processing device 1200 of the second embodiment using the separated type MAC 230, the load operation and the multiplication and addition arithmetic operation for two operands can be executed in only one clock, so that it can be possible to execute the multiplication and addition arithmetic operation in one clock.

On the other hand, the conventional information processing device 1200 shown in FIG. 12 must require 3 clocks for the execution of the multiplication and addition arithmetic operation because the load operation and the multiplication and addition arithmetic operation for two operands must be independently executed in different instructions (LD and MAC).

EMBODIMENT 3

Figure 8:
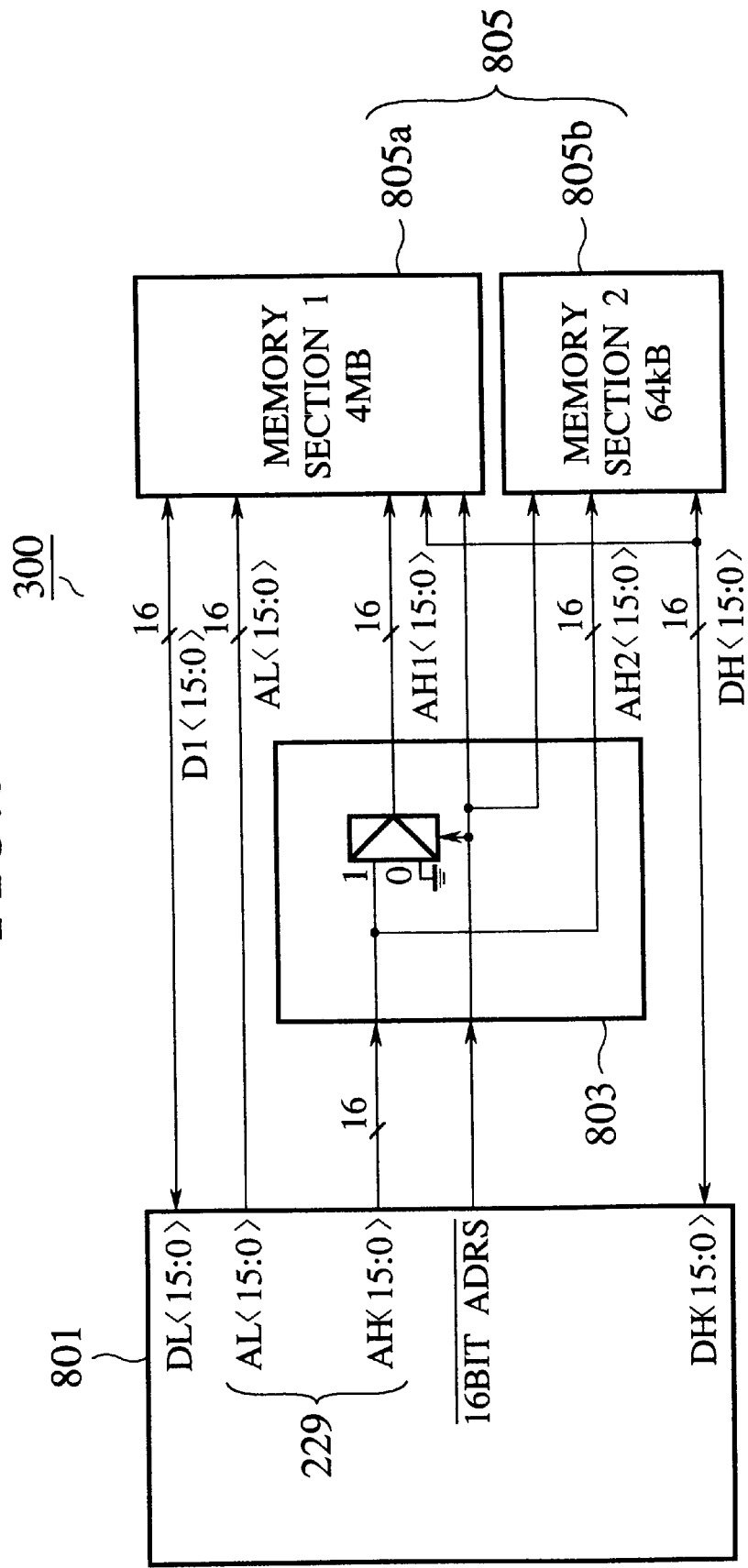
FIG. 8 shows a block configuration diagram of a 32 bit information processing system including the information processing device of the present invention.

FIG. 8 is a diagram showing a block configuration diagram of a 32 bit information processing system 300 including the information processing device of the present invention.

Next, the configuration and the operation of the 32 bit information processing system 300 of the third embodiment shown in FIG. 8 will be explained.

The information processing system 300 comprises a core processor 801, a bus control unit 803, and a memory section 805. In the information processing system 300 of the third embodiment, a 32 bit data item is divided into a pair of parts, namely a pair of 16 bit parts to generate a pair of 16 bit addresses.

Here, the configuration of the core processor 801 is equal to the configuration of the core processor CORE1 in the information processing device 100 of the first embodiment as shown in FIG. 2. At the memory access stage, addresses and the division control signal (16bitADRS) are generated and transferred to various sections.

In the case of the third embodiment as shown in FIG. 8, the memory access control section 115 (see FIG. 1 and FIG. 8) comprises the address output means designated by the reference characters AL (lower address) and AH (higher address), the division control signal output means designated by the reference character /16bitADRS, and the plurality of data input means designated by the reference characters DL (lower data) and DH (higher data).

Next, the bus control unit 803 receives address from other address output means other than one address output means in the plurality of address output means and the division control signal and then the addresses from the other address output means are switched based on the division control signal /16bitADRS through the division control signal output means.

The memory section 805 comprises the first memory section 805a and the second memory section 805b. The first memory section 805a receives the address from one of the plurality of the address output means AL and AH, combines the address (AL) from the address output means and the address (AH1) transferred through the bus control unit 803 when the first memory section 805a also receives the address transferred from the bus control unit 803, fetches the data addressed by the combined address, divides the fetched data into the lower order data (DL) and the upper order data (DH), and transfers the data DL and the data DH to the other data input means in the core processor 801. The second memory section 805b receives the address AH2 from the other address means AH and the division control signal /16bitADRS, and transfers the data addressed by this address to the other data input means DH.

The core processor 801 and the pair of the first memory section 805a and the second memory section 805b are connected through the address buses AL and AH and the data buses DL and DH.

In addition, the division control signal /16bitADRS is used for the address decode operation in the bus control unit and used for the generation of the control signals used for each of the memory sections 805a, 805b.

The upper order address AH <15:0> is divided into the upper order address AH1 <15:0> for the first memory section 805a and the upper order address AH2 <15:0> for the second memory section 805b and they are transferred.

The lower order address AL <15:0> is transferred only to the first memory section 805a. The upper order address AH <15:0> is transferred to both the first memory sections 805a and the second memory section 805b. The upper order data DH <15:0> may be transferred to both the first and second memory sections 805a and 805b, the lower order data DL <15:0> may be transferred only to the first memory section 805a. The first memory section 805a has the 32 bit address space (4 MB) and the second memory section 805b has the 16 bit address space (64 kB).

When the two operand access operations are executed, only the lower order 16 bit address space in the first memory section 805a can be accessed.

Figure 10:
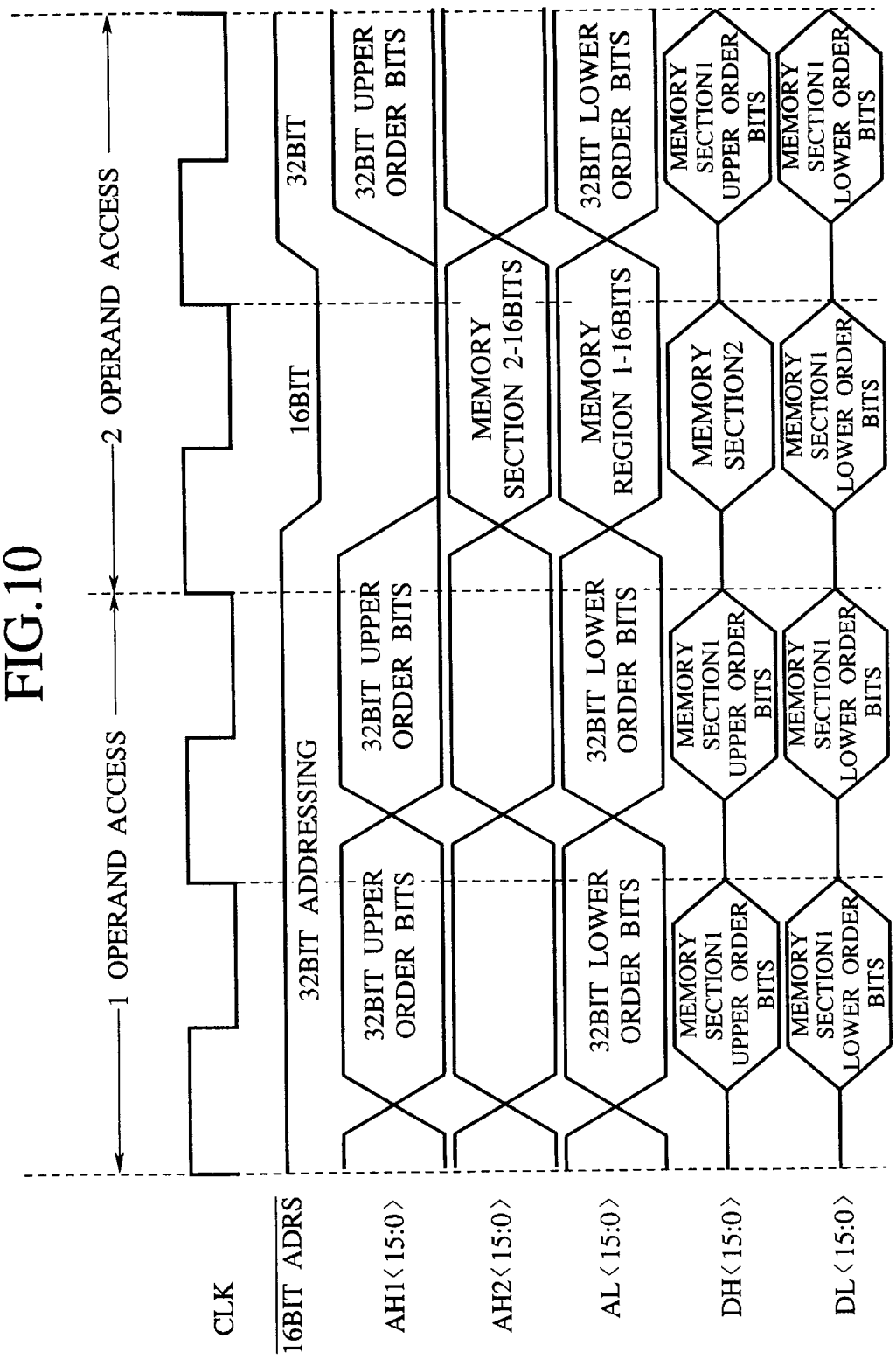
FIG. 10 is a timing chart of the 32 bit information processing system shown in FIG. 8.

FIG. 10 is a timing chart of the 32 bit information processing system 300 shown in FIG. 8.

We will explain the following case where both the first and second memory sections 805a and 805b are accessed when the two operand access operation is carried out in the information processing system 300 of the third embodiment according to the present invention.

First, the operation for one operand access will be explained. At the one operand access operation, the bit width of the address from the core processor 801 is the 32 bit width. The reversed signal of the 16 bitADRS having the value "1" indicates the one operand access operation. In this case, the upper order address AH is transferred to the bus control unit 803 to divide it into both the address AH1 and AH2. The first memory section 805*a* receives the 32 bit address which is obtained by combining the addresses AH and AL according to an address strobe signal at the falling edge of the clock CLK. After this, the first memory section 805*a* transfers data DH and DL which are fetched by addresses obtained by dividing a 32 bit data item into two 16 bit data items. In this case, no data access operation is performed for the second memory section 805*b*.

Next, the two operand access operation will be explained. At the two operand access operation, a pair of 16 bit addresses are transferred form the core processor. The reversed signal of the 16 bitADRS having the value "0" indicates the two operand access operation. In this case, the upper order address AH1 for the first memory section 805*a* are set to zero by the bus control unit 803 according to the level of the division control signal /16bitADRS. Thereby, the 32 bit address that is obtained by combining the AH1 and AH2 is set to an address of a 16 bit width or less.

The address AH2 corresponding to the second memory section 805*b* is transferred without changing of the bit width. In the data input/output operation, the address DL is used for the first memory section 805*a* and the DH for the second memory section 805*b*. Therefore only data whose bit width is within 16 bits is used during the two operand access operation. It is prevent to use the address DL for the first memory section 805*a* under the control signal 16bitADRS.

Thus, the third embodiment of the present invention shows the configuration of the information processing system 300 having the information processing device 100 of the first embodiment. In this case, the two memory sections, the first memory section 805*a* and the second memory section 805*b* are incorporated in the information processing system 300. Further, the arithmetic operation speed can be increased by storing a 16 bit address into each of the first and second memory sections 805*a* and 805*b* when the specified instructions, such as the MLD instruction to execute the two memory access operations at the same time, are executed in order to increase the operation efficiency of the information processing device 300.

EMBODIMENT 4

Figure 9:
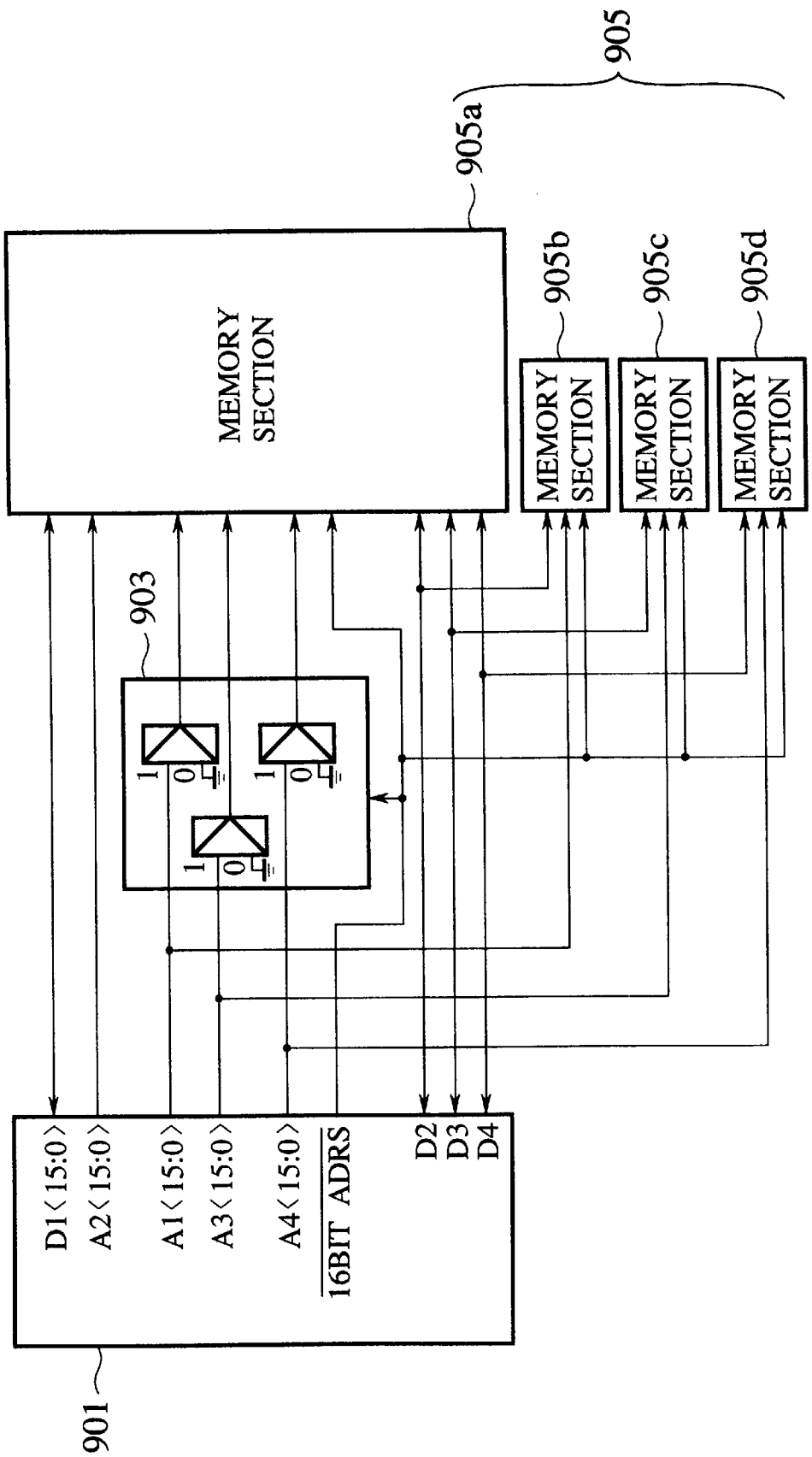
FIG. 9 shows a block configuration diagram of a 64 bit information processing system including the information processing device of the present invention.

FIG. 9 is a diagram showing a block configuration diagram of the 64 bit information processing system 400 including the information processing device of the present invention.

In the information processing system 400 as shown in FIG. 9, the memory section 905 is divided into four memory regions 905*a*, 905*b*, 905*c*, and 905*d* each having the 16 bit width.

The information processing system 400 of the fourth embodiment comprises a core processor 901, a bus control unit 903, and the memory section 905 including the four 16 bit memory sections 905*a*, 905*b*, 905*c* and 905*d*, like the configuration of the information processing system 300 of the third embodiment.

The method for processing of four addresses each having the 16 bit width will be explained.

Here, the configuration of the core processor 801 incorporated in the information processing system 400 of the fourth embodiment is equal to the information processing device 100 of the first embodiment.

The core processor 801 generates an address and the divisional control signal (/16bitADRS) at a memory access stage.

The memory access control section 115 incorporated in the information system 100 comprises a plurality of address output means A1, A2, A3, and A4 (see FIG. 9), a division control signal output means /16bitADRS and the plurality of data input means D1, D2, D3, and D4. The address output means designated by the reference characters A1, A2, A3, and A4, as shown in FIG. 9, divide an address into a plurality of address parts and transfers the divided address parts when the number of arithmetic result of the arithmetic section 111 (see FIG. 1) is one and transfers addresses when the number of the arithmetic result of the arithmetic section 111 (see FIG. 1) is not less than two. The division control signal output means transfers the division control signal /16bitADRS. The data input means D1, D2, D3, and D4 receive data from the memory means 905.

The bus control means 903 receives a plurality of addresses A1, A3, and A4 transferred from the other address output means and the division control signal /16bitADRS, switches and transfers the addresses to the memory parts 905*a*, 905*b*, 905*c*, and 905*d*.

The memory section 905 has the four memory regions 905*a*, 905*b*, 905*c* and 905*d*. The memory region 905*a* receives addresses (A2) from the address output means, or receives the address which is combined by the address A2 transferred from one address output means and an address from the bus control unit 903 when the bus control means 903 also receives the addresses (A1, A3, A4 in the core processor 901 as shown in FIG. 9). Then, the memory region 905*a* fetches the data addressed by the combined address described above, and divides the fetched data and transfers the data to the data input parts D1, D2, D3, and D4 as the plurality of data input/output means. The other memory regions 905*a*, 905*c*, and 905*d* receive the addresses from the other address output means A1, A3, and A4 and the division control signal /16bitADRS, and then fetched data in these memory parts 905*b*, 905*c*, and 905*d*, and transfers the fetched data to the other data input/output means D2, D3, and D4.

By using the configuration as shown in FIG. 9, the present invention can be applied to the case where data is accessed by dividing a 64 bit width data into four data parts such as the memory sections 905*a*, 905*b*, 905*c*, and 905*d*, each having the 16 bit width.

In addition, the arithmetic operation speed can be increased by accessing each 16 bit address simultaneously addressing each of four memory sections 905*a*, 905*b*, 905*c*, and 905*d* when the specified instructions, such as the MLD instruction to execute the four memory access operations at the same time, are executed in order to increase the operation efficiency of the information processing device 400 of the fourth embodiment.

When comparing the operation speeds between the information processing system 400 of the fourth embodiment and the conventional information device 1100 shown in FIG. 11 under the same condition that a same frequency of the clock is used and a plurality of operand load/store operations are executed, the operation speed of the information processing system of the fourth embodiment is higher than that of the conventional processing device 1100. In addition, the information processing system of the fourth embodiment can use a clock frequency which is lower than the clock frequency used for the conventional information processing device when a same arithmetic instruction is executed by both of the information processing system of the present invention and the conventional information processing device. Thereby, the information processing device of the present invention can reduce the power consumption.

As described above in detail, the information processing devices and the information processing systems each can execute a plurality of operand load/store operations simultaneously without considerable increasing of a hardware size in addition to the configuration of the conventional information processing device and can increase the arithmetic operation speed thereof.

While the above provides a full and complete disclosure of the preferred embodiment of the present invention, various modifications, alternate constructions and equivalents can be employed without departing from the true spirit and scope of the invention. Therefore the above description and illustration should not be construed as limiting the scope of the present invention, which is defined by the appended claims.

What is claimed is:

1. An information processing device comprising:
   an instruction input section for receiving an instruction code to be processed;
   an instruction decode section for decoding the instruction code stored in the instruction input section and for generating an operand and control signals and for transferring the operand and the control signals;
   an instruction division control section for generating division control signals based on the control signals generated by the instruction decode section;
   an operand selection section for dividing at least the operand stored in the instruction decode section or an operand stored in an arithmetic result storing section to store an arithmetic result of arithmetic operation into a plurality of operand parts based on the division control signals transferred from the instruction division control section;
   an arithmetic section for dividing the operand parts transferred from the operand selection section into a plurality of operand items each having a desired bit width based on the division control signals transferred from the instruction division control section and for performing arithmetic operations of divided operand items at the same time in order to generate a plurality of addresses of data required for an operation as specified by the instruction code and for transferring arithmetic results, wherein said addresses are non-sequential;
   the arithmetic result storing section for storing arithmetic results and the data transferred from a memory access control section to be used for a memory access operation to a memory, and for transferring the arithmetic results and the data items to the operand selection section; and
   the memory access control section for receiving addresses transferred from the arithmetic section to be used for the memory access operation to the memory, for transferring the addressees for the memory and division control signals and for transferring the data items obtained from the memory to the arithmetic result storing section.

2. An information processing device as claimed in claim 1, wherein the memory access control section comprises:
   address output means for dividing and transferring the address into a plurality of address parts each having a desired bit width when the number of the arithmetic results is one, and for generating each of the addresses of the arithmetic results when the number of the arithmetic results is not less than one;
   division control signal output means for generating and transferring the division control signals; and
   a plurality of data input means for receiving and storing the data items which are read from the memory.

3. An information processing device as claimed in claim 1, wherein the arithmetic section comprises:
   carry line cut means for halting a carry propagation of at least one bit to a higher order bit based on the division control signals when the division control signals indicate that the instruction code is a divisional instruction, wherein a plurality of addresses in the memory to be accessed are calculated at the same time in parallel by the arithmetic section.

4. An information processing device as claimed in claim 1, wherein the arithmetic section comprises address calculation means for calculating the operand transferred from the operand selection section and for transferring a calculated result;
   carry line cut means for stopping a carry propagation of at least one bit to a higher order bit based on the division control signals when the division control signals indicate that the instruction code is a divisional instruction; and
   specified arithmetic execution means for executing a specified arithmetic operation;
   wherein the specified arithmetic operation and the arithmetic operation can be carried out simultaneously.

5. An information processing device as claimed in claim 1, wherein the arithmetic section comprises address calculation means for calculating the operand transferred from the operand selection section and for transferring a calculated result;
   carry line cut means for stopping a carry propagation of at least one bit to a higher order bit based on the division control signals when the division control signals indicate that the instruction code is a divisional instruction; and
   specified arithmetic execution means for executing a specified arithmetic operation;
   wherein the specified arithmetic execution means can be separated from the information processing device.

6. An information processing device as claimed in claim 1, wherein the memory is made up of a pair of 16 bit memory sections, each of the 16 bit memory sections is accessed per a 16 bit data item, the arithmetic section generates addresses to be transferred to the pair of memory sections, and the pair of 16 bit memory sections are accessed based on the addresses generated by the arithmetic section.

7. An information processing device as claimed in claim 2, wherein the memory includes a pair of 16 bit memory sections, each of the 16 bit memory sections is accessed per a 16 bit data item, the arithmetic section generates addresses to be transferred to the pair of memory sections, and the pair of 16 bit memory sections are accessed based on the addresses generated by the arithmetic section.

8. An information processing device as claimed in claim 3, wherein the memory includes a pair of 16 bit memory sections, each of the 16 bit memory sections is accessed per a 16 bit data item, the arithmetic section generates addresses to be transferred to the pair of memory sections, and the pair of 16 bit memory sections are accessed based on the addresses generated by the arithmetic section.

9. An information processing device as claimed in claim 4, wherein the memory includes a pair of 16 bit memory sections, each of the 16 bit memory sections is accessed per a 16 bit data item, the arithmetic section generates addresses to be transferred to the pair of memory sections, and the pair of 16 bit memory sections are accessed based on the addresses generated by the arithmetic section.

10. An information processing device comprising:

arithmetic means for performing an arithmetic operation with the maximum bit widths of the information processing device;

memory access means for accessing data items stored in a memory by supplying arithmetic results onto a plurality of address buses each having a specified bit width;

arithmetic means for independently executing arithmetic operations of the specified bit widths on the plurality of address buses so that the sum of the bit width of the plurality of address buses is not over the maximum bit width and generating arithmetic results;

control means for transferring the arithmetic results onto the address buses and for transferring a control signal indicating that the arithmetic results on the address buses are addresses independently to each other, each having the predetermined bit width, wherein said addresses are non-sequential and calculated in parallel;

wherein memory accessing are performed at the same time by using the addresses on the address buses.

11. An information processing device as claimed in claim 10, wherein the control signal indicating that the arithmetic results are on the address buses is generated by using a decoded result of an instruction to be executed by the information processing device.

12. An information processing device as claimed in claim 10, wherein inputs provided into the arithmetic means corresponding to each bit width are selected independently when arithmetic operations are performed by using the predetermined bit widths independently.

13. An information processing device as claimed in claim 10, wherein when the predetermined number of the memory access operations are performed simultaneously, the data buses that is used during the normal operation mode are used by dividing the data buses with a predetermined number so that the divided data buses are used independently to each other.

14. An arithmetic information processing system comprises:

an instruction input section for receiving an instruction code;

an instruction decode section for decoding the instruction code received by the instruction input section, for generating operands and control signals and for transferring them;

an instruction division control section for generating division control signals based on the control signals generated by the instruction decode section;

an operand selection section for dividing the operand at least stored in the instruction decode section or an arithmetic result storing section to store the arithmetic result into a plurality of operand parts each having a specified bit width;

an arithmetic section for dividing the plurality of operand parts transferred from the operand selection section into parts each part having a specified bit width based on the division control signal transferred from the instruction division control section, for executing arithmetic operations of the divided operand parts at the same time and for transferring arithmetic results;

the arithmetic result storing section for storing data transferred from the arithmetic section and data transferred from the memory access section to control the access operation to the memory section and for transferring the data to the operand selection section;

a plurality of address output sections for dividing an address into parts each having a specified bit width and for transferring the parts when the arithmetic result of the arithmetic section is one, and for transferring addresses corresponding to the arithmetic results when the arithmetic results is not less than two;

division control signal output section for transferring the division control signals;

a plurality of data input means for storing data read from the memory section;

an information processing section for transferring the data obtained from the memory to the arithmetic result storing section;

a bus control unit section for receiving addresses from the other address output means other than one address output means in the plurality of address output means and the division control signal and for switching the addresses obtained from the other address output means based on the division control signal;

a first memory region for receiving the address transferred from at least one address output means in the plurality of address output means, for dividing the data stored in the memory section indicated by an address which is made by combining the address from the address output means with the address transferred from the bus control unit section when the address is transferred from the bus control unit section, and for transferring the divided data items to one data input means in the plurality of input means and the other data input means; and second memory regions of at least two or more for receiving the address transferred from the other address output means and the division control signal and for transferring the data stored in the memory indicated by the address based on the division control signal into the other data input means.

15. An information processing system as claimed in claim 14, wherein, the memory section comprises a pair of memory regions each of which is accessed per a 16 bit width.

16. An information processing system as claimed in claim 14, wherein the memory section comprises four memory regions each of which is accessed per a 16 bit width.

* * * * *